US010901672B2

(12) United States Patent
Arakawa

(10) Patent No.: US 10,901,672 B2
(45) Date of Patent: Jan. 26, 2021

(54) INFORMATION PROCESSING DEVICE, IMAGE PROCESSING SYSTEM AND NON-TRANSITORY COMPUTER-READABLE RECORDING MEDIUM STORING INSTRUCTIONS TO CONTROL THE SAME

(71) Applicant: BROTHER KOGYO KABUSHIKI KAISHA, Aichi (JP)

(72) Inventor: Eiji Arakawa, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 16/263,211

(22) Filed: Jan. 31, 2019

(65) Prior Publication Data
US 2019/0250866 A1 Aug. 15, 2019

(30) Foreign Application Priority Data
Feb. 13, 2018 (JP) .................. 2018-022934

(51) Int. Cl.
*H04N 1/00* (2006.01)
*G06F 3/12* (2006.01)

(52) U.S. Cl.
CPC .......... *G06F 3/1285* (2013.01); *G06F 3/1201* (2013.01); *G06F 3/1203* (2013.01); *G06F 3/1259* (2013.01); *H04N 1/00241* (2013.01); *H04N 1/00694* (2013.01)

(58) Field of Classification Search
CPC .... G06F 3/1285; G06F 3/1203; G06F 3/1259; G06F 17/248; G06F 17/212; G06F 17/211; G06F 3/1243; G06F 3/1242; G06F 3/125; H04N 1/00137; H04N 1/00177; H04N 1/00196; H04N 1/00188; H04N 1/00169; H04N 1/00172; H04N 1/00161; H04N 1/00135; G06T 11/60
USPC ................ 358/1.11–1.18, 1.9, 2.1; 715/274; 382/284; 345/641
See application file for complete search history.

(56) References Cited

U.S. PATENT DOCUMENTS 5,983,243 A * 11/1999 Heiney ................ G06F 40/174
715/235
6,078,403 A * 6/2000 Palmer ................. G06F 40/103
358/1.18

(Continued)

FOREIGN PATENT DOCUMENTS

JP 2006-268645 A 10/2006

*Primary Examiner* — Chad Dickerson
(74) *Attorney, Agent, or Firm* — Scully, Scott, Murphy & Presser, PC

(57) ABSTRACT

The printer obtains template data from an application. Further, the printer drive obtains image data of a composition image from a scanner or a folder stored in a data storage area. The printer driver identifies, in a template image indicated by the template data, a composite area in which the composition image is to be composed based on the template data or information stored in the data storage area. Then, the printer driver generates image data of an image in which the composition image is composed in the identified composite area of the template image. With this configuration, the image in which the composition image is composed can be generated without requiring a user to obtain the composition images or without requiring the user to compose the composition image with the template image.

11 Claims, 8 Drawing Sheets

(56) References Cited

U.S. PATENT DOCUMENTS

| | | | | |
|---|---|---|---|---|
| 7,375,842 | B2* | 5/2008 | Kloosterman | G06K 15/02 358/1.1 |
| 8,139,256 | B2* | 3/2012 | Motamed | H04N 1/00442 358/1.18 |
| 2006/0044636 | A1* | 3/2006 | Iinuma | H04N 1/41 358/540 |
| 2008/0306975 | A1* | 12/2008 | Michaelson | G06F 40/174 |
| 2011/0157226 | A1* | 6/2011 | Ptucha | G06T 11/60 345/638 |
| 2012/0102398 | A1* | 4/2012 | Cok | G06F 40/186 715/274 |
| 2012/0321217 | A1* | 12/2012 | Cok | G06K 9/36 382/284 |
| 2014/0254886 | A1* | 9/2014 | Plettinck | G06F 3/1208 382/112 |

* cited by examiner

INFORMATION PROCESSING DEVICE, IMAGE PROCESSING SYSTEM AND NON-TRANSITORY COMPUTER-READABLE RECORDING MEDIUM STORING INSTRUCTIONS TO CONTROL THE SAME

CROSS-REFERENCE TO RELATED APPLICATION

This application claims priority under 35 U.S.C. § 119 from Japanese Patent Application No. 2018-022934 filed on Feb. 13, 2018. The entire subject matter of the application is incorporated herein by reference.

BACKGROUND

Technical Field

The present disclosures relate to an information processing device, an information processing system and a non-transitory computer-readable recording medium storing instructions for controlling the information processing device.

Related Art

Conventionally, a technique in which a user registers scan data which is created by a scanner with an information processing device, and print a document edited by the user with using an image represented by the scan data as a background of the document.

SUMMARY

According to the above-described conventional technique, when an image based on the scan data is used as an image to be composed with another image (e.g., a text) created by a user, it is necessary for the user to register the scan data (i.e., the image to be composed as a background) with the information processing device. Such an operation is relatively inconvenient for the user.

According to aspects of the present disclosure, there is provided a non-transitory computer-readable medium storing computer-readable instructions that are executable by a controller of an information processing device. The instructions causing, when executed by the controller, the information processing device to execute a first obtaining process of obtaining template data, an identifying process of automatically identifying a composite area within a template image represented by the template data after the template data is obtained by the first obtaining process, a second obtaining process of obtaining composition image data of a composition image to be composed with the template image represented by the template data after the template data is obtained by the first obtaining process, a generating process of generating output image data representing an output image in which the composition image represented by the composition image data is composed within the composite area of the template image identified by the identifying process after the composition image data is obtained by the second obtaining process, and an outputting process of outputting the output image represented by the output image data generated by the generating process.

According to aspects of the present disclosure, there is provided an information processing device having a controller. The controller is configured to perform: a first obtaining process of obtaining template data; an identifying process of automatically identifying a composite area within a template image represented by the template data after the template data is obtained by the first obtaining process; a second obtaining process of obtaining composition image data of a composition image to be composed with the template image represented by the template data after the template data is obtained by the first obtaining process; a generating process of generating output image data representing an image in which the composition image represented by the composition image data is composed within the composite area within the template image identified by the identifying process after the composition image data is obtained by the second obtaining process; and an outputting process of outputting an output image represented by the output image data generated by the generating process.

According to aspects of the present disclosure, there is provided an image processing system including: an information processing device having a controller; and a printer. The controller is configured to perform: a first obtaining process of obtaining template data; an identifying process of automatically identifying a composite area within a template image represented by the template data after the template data is obtained by the first obtaining process; a second obtaining process of obtaining composition image data of a composition image to be composed with the template image represented by the template data after the template data is obtained by the first obtaining process; a generating process of generating output image data representing an image in which the composition image represented by the composition image data is composed within the composite area within the template image identified by the identifying process after the composition image data is obtained by the second obtaining process; and an outputting process of outputting, to the printer, an output image represented by the output image data generated by the generating process.

BRIEF DESCRIPTION OF THE ACCOMPANYING DRAWINGS

DETAILED DESCRIPTION OF THE EMBODIMENT

Figure 1:
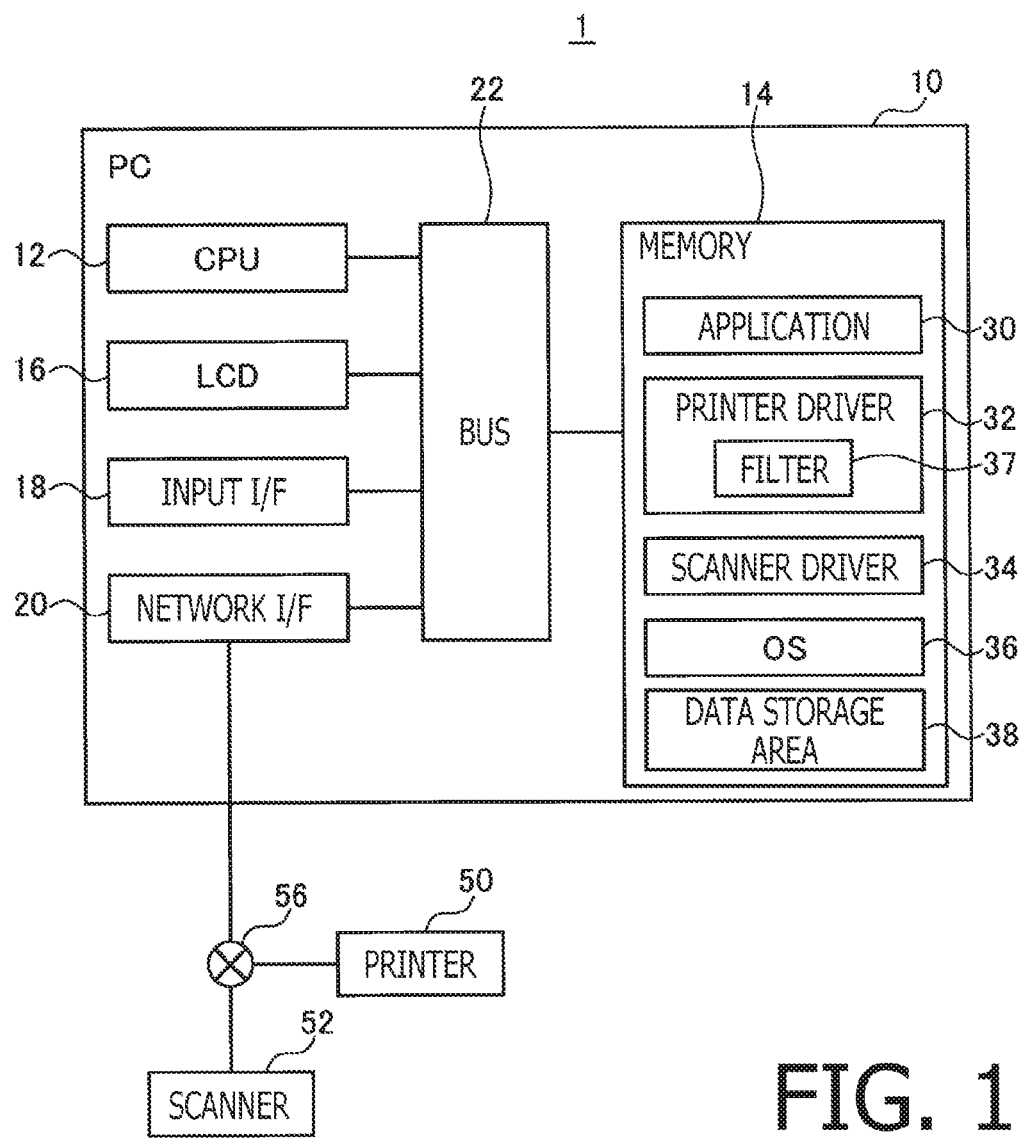
FIG. 1 is a block diagram of a printer system according to an illustrative embodiment of the present disclosures.

FIG. 1 is a block diagram of a printer system 1 according to an illustrative embodiment of the present disclosures. The printer system 1 includes, as shown in FIG. 1, a PC (which is an example of an information processing device) 10, a printer 50 and a scanner 52. The PC 10 is mainly provided with a CPU (which is an example of a computer and/or a controller) 12, a memory 14, an LCD (which is an example of a display) 16 and an input I/F 18, a network I/F (which is an example of a communication I/F) 20, which are interconnected with each other through a bus 22 so as to be communicate with each other.

The PC 10 is configured to communicate with the printer 50 and the scanner 52 through the network I/F 20 and the network 56. As a method of communication, a wired LAN, a USB, Wi-Fi® and Bluetooth® can be employed. The printer 50 transmits and receives various pieces of information and instruction signals to/from the PC 10, and executes a printing process in accordance with control by the PC 10. The scanner 52 has an ADF function. The scanner 52 transmits and receives various pieces of information and instruction signals to/from the PC 10, scans one or more sheets of an original placed on an ADF tray one by one, and generates scan data under the control of the PC 10.

The CPU 12 executes processes in accordance with applications 30 stored in a memory 14, a printer driver (which is an example of a control program) 32, a scanner driver 34 and OS 36. The applications 30 are programs are for creating contents. For example, the applications include a word processing software for creating a text content, a spreadsheet software for creating a spreadsheet content, and a presentation software for creating a presentation content. A content created by the application 30 is printing by the printer 50 which is connected to the PC 10 when the application 30 instructs the OS 36 to execute printing. When the application 30 instructs the OS 36 to print a content, the application 30 outputs content data representing the content in a format which can be interpreted by the OS 36 and transmits the same to the OS 36. In the following description, the content data the application 30 transmits to the OS 36 will be described as a kind of image data. It is noted that a process related to the printing executed by the OS 36 is executed by a print system implemented to the OS 36.

A printer driver 32 is a device driver for the printer 50. The printer driver 32 has a filter 37, which generates image data for printing. A scanner driver 34 is a device driver for the scanner 52. The scanner driver 34 instructs the scanner 52 to execute scanning. The OS 36 provides basic functions which are used by the applications 30, the printer driver 32 and the scanner driver 34. Examples of the OS 36 are operation systems such as Windows®, MacOS®, Linux®, Android®, iOS® and the like. In the following description, the CPU 12 which executes the printer driver 32 and the like will be simply referred to by names of executed programs. That is, an expression "the printer driver 32 is . . . " may mean that "the CPU 12 executing the printer driver 32 is . . . ."

The memory 14 has a data storage area (which is an example of a storage area) 38. The data storage area 38 is for storing data necessary of executing the printer driver 32 and the like. It is noted that the memory 14 is configured by each of, or a combination of some or all off a RAM, a ROM, a flash memory, an HDD, a buffer provided to the CPU 12 and the like.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

The LCD 16 is configured to display various functions of the PC 10. The input I/F 18 includes a keyboard and a mouse, and serves as an interface through which user operations are input to the CPU 12.

Figure 2A:
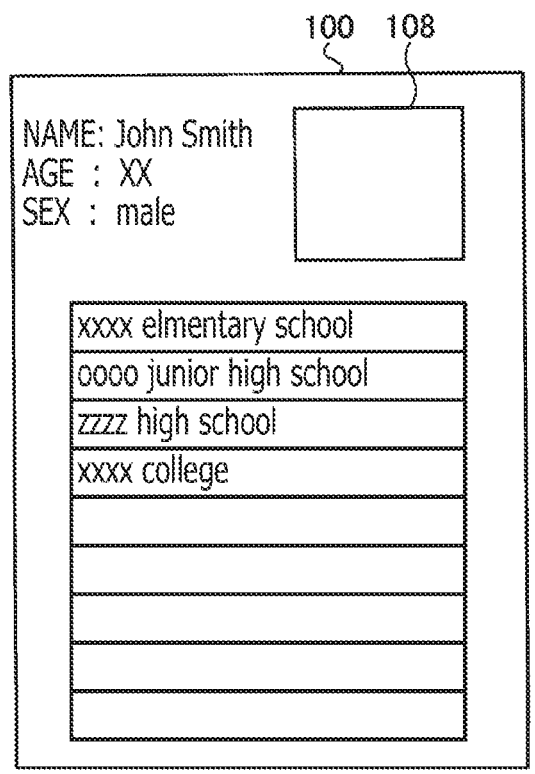
FIGS. 2A and 2B show examples of personal resumes before face images are composed.
Figure 2B:
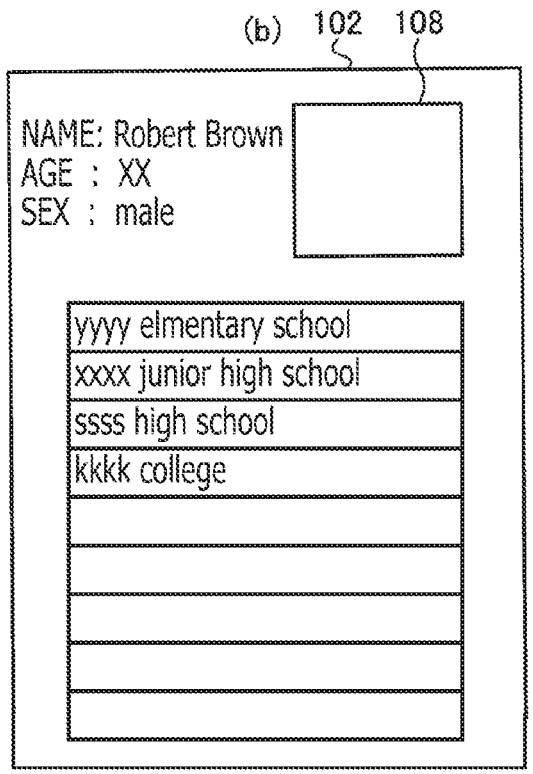

In the printer system 1 configured as above, when the application 30 is the word processing software used to create a text content, image data representing personal resumes 100 and 102 shown in FIGS. 2A and 2B is created with the application 30 and is transmitted to the printer driver 32. Thereafter, the printer driver 32 obtains image data of face images to be composed with the personal resumes 100 and 102, and generates print data of the composite images representing the personal resumes 100 and 102 with which the faces images are composed, respectively, based on the obtained image data. When the printer driver 32 transmits the thus generated print data to the printer 50, the printing process is executed in the printer 50, and the personal resumes 110 and 112, with which the face images have been composed, respectively are generated. An operation of the printer system 1 when the personal resumes 110 and 112, with which the face images have been composed, are generated will be described below.

It is noted that, in the following description, processes of the CPU 12 in accordance with instructions scripted in programs are basically indicated. Processes indicated by terms "determine", "extract", "select", "calculate", "judge", "identify", "obtain", "receive", "control" and "set" are the processes of the CPU 12. It is noted that the processes executed by the CPU 12 include hardware control through the OS 36. It is further noted that the term "obtain" will be used to mean a concept in which a request is not necessary. That is, a process in which the CPU 12 receive data without requesting for the same is included in a concept that the CPU 12 obtains the data. Further, a term "data" in the specification is represented by a computer-readable bit array. A plurality of pieces of data having substantially the same meaning/contents but different formats will be treated as the same data. A term "information" used in the specification will be treated in the same manner. Further, the processes of "instruct", "respond" and "request" are executed by communicating information/data indicating "instruct", "respond" and "request", respectively. Further, terms "instruct", "respond", "request" may be described as information representing the same, respectively.

In the PC 10 of the printer system 1, the application 30 generates image data (hereinafter, referred to as template data) representing personal resumes 100 and 102 respectively shown in FIGS. 2A and 2B. When receiving a print instruction of the image based on the template data, the application 30 output the template data to the OS 36. Then, the OS 36 outputs the template data to the printer driver 32. It is noted that the template data may be of a postscript format data (i.e., a PS file).

Figure 4:
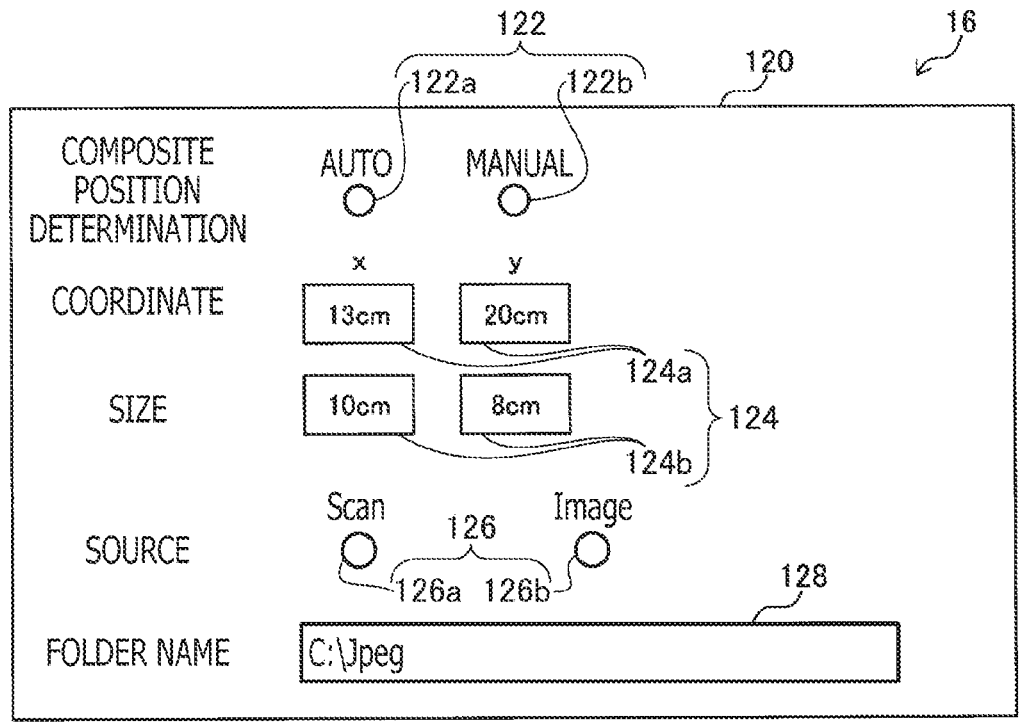
FIG. 4 shows an example of a setting screen.

Referring to FIGS. 8-11, processes when the printer driver 32 is executed will be described. When receiving the template data (S100), the printer driver 32 invokes the filter 37 (S102). Then, the filter 37 displays a setting screen 120 (see FIG. 4) on the LCD 16 (S103). The setting screen 120 is for setting information regarding acquisition of images to be composed with the personal resumes 100 and 102. Hereinafter, images for composition (i.e., to be composed) will be referred to as "composition images." The setting screen 120 is for setting information regarding acquisition of the image data of the face images. On the setting screen 120, composite area setting mode selection buttons 122a and 122b, composite area information input fields 124a and 124b, composition image acquisition source selection buttons 126 and a folder name input field 128 are displayed (see FIG. 4).

The composite area setting mode selection buttons 122 are for selecting whether areas in which images to be composed in the resumes 100 and 102 (hereinafter, referred to as composite areas) are to be determined automatically or manually. The composite area is, in other words, an area on which the composition image is pasted. The composite area setting mode selection buttons 122 includes an automatic selection button 122a selecting a mode in which the composite areas are automatically selected, and a manual selection button 122b selecting a mode in which the composite areas are manually selected. The composite area information input fields 124 are fields in which information regarding the composite areas is manually input when the manual selection button 122b is operated. The composite area information input fields 124 include coordinate input fields 124a in which coordinates of points of origins of the composite areas are to be input, and size input fields 124b in which sizes of the composite areas are input. It is noted that numbers input in the composite are information input fields 124 (i.e., 124a and 124b) indicate inside of a frame 108 at an upper right portion in each of the personal resumes 100 and 102 shown in FIGS. 2A and 2B. That is, for the personal resumes 100 and 102, insides of the frames 108 are set as composite areas to which composition images are composed (i.e., pasted).

The composition image acquisition source selection buttons 126 are for selecting an acquisition source of the composition images, and include a scanner selection button 126a to select a scanner as the acquisition source of the composition images and an image selection button 126b to select a folder containing images as the acquisition source of the composition images. The folder name input field 128 is a field in which a name of a folder, which is to be the acquisition source of the composition images, is to be input when the image selection button 126 is operated.

When the scanner selection button 126a is operated, or when the image selection button 126b is operated and the folder name is input in the folder name input filed 128, the operation and input results are stored in the data storage area 38.

When the printer driver 32 receives the template data, the invoked filter 36 divides the template data into multiple pieces of template data each corresponding to one page of template (S104). For example, when the application 30 creates the template data for the personal resumes 100 and 102 shown in FIG. 2, the created template data contains two pages of the personal resumes 100 and 102. The printer driver 32 receives the template data containing the two personal resumes 100 and 102. Then, the filter 37 divides the template data containing two pages of personal resumes 100 and 102 into two pieces of template data corresponding to the personal resumes 100 and 102, respectively. Next, the filter 37 determines whether the composite area is set manually (S106). That is, in S106, the filter 37 determines whether the manual selection button 122b has been operated in the setting screen 120.

After execution of S106, the filter 37 obtains information regarding the composite area (hereinafter, referred to as composite area information). At this stage, in accordance with the operation of the composite area setting mode selection button 122 on the setting screen 120, a method of obtaining the composite area information differs. When the automatic selection button 122a is selected on the setting screen 120 (S106: NO), the filter 37 obtains the composite area information from the template data. For example, in the personal resumes 100 and 102, the frame 108 is indicated in green, and the filter 37 is programmed to recognize an area surrounded by green lines as the composite area. Therefore, the filter 37 analyzes the template data and obtains information regarding an area surrounded by the green lines in an image based on the template data as the composite area information. The composite area information includes at least information indicating the coordinates and the size of the composite area. An example of such information indicating the coordinates and the size of the composite area is information indicating all the coordinates of all the apexes of the rectangular composite area. Another example of the information indicating the coordinates and the size of the composite area is information indicating the coordinate of one of the apexes of the composite area and the size of the composite area. As above, the composite area information can be automatically obtained.

When the manual selection button 122b is selected on the setting screen 1120 (S106: YES), the user had input the composite area information in the composite area information input field 124, and the input content in the composite area information input field 124 (i.e., the composite area information) has been stored in the data storage area 38. Therefore, in this case, the filter 37 retrieves the composite area information from the data storage area 38 (S112).

Figure 9:
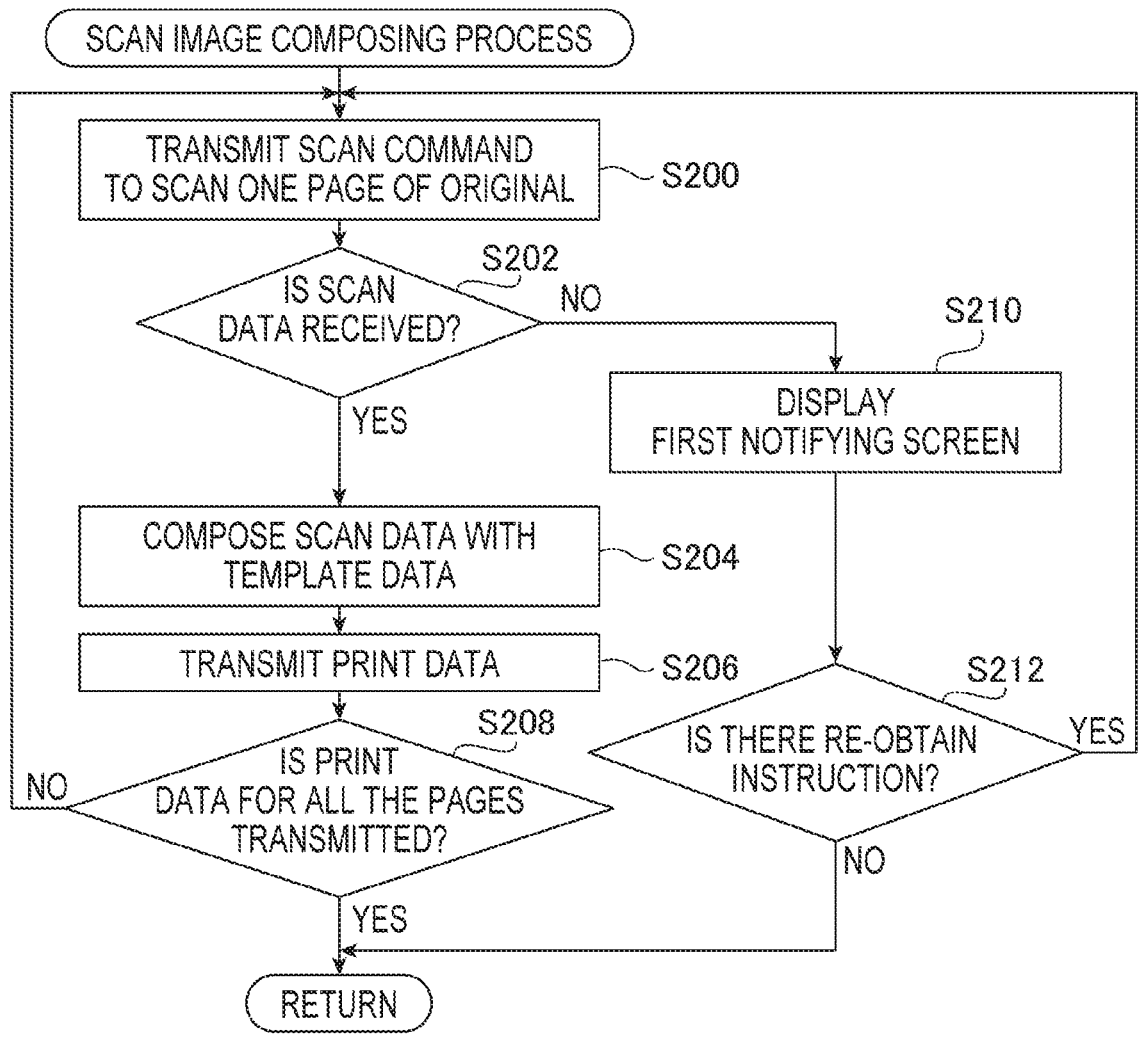
FIG. 9 is a flowchart illustrating a scan image composing process executed by the printer driver.
Figure 10:
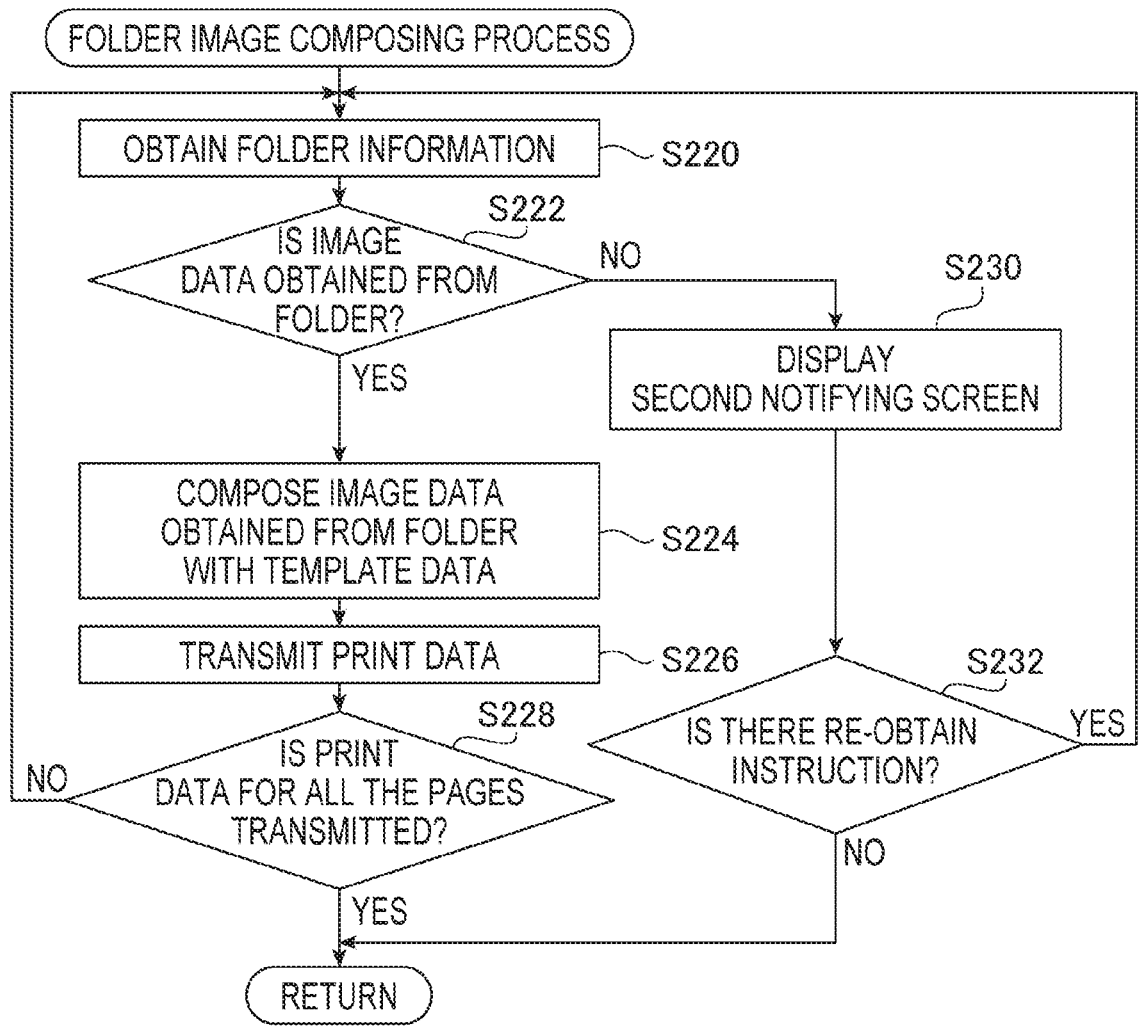
FIG. 10 is a flowchart illustrating a folder image composing process executed by the printer driver.

Next, the filter 37 determines whether the scanner is selected as the acquisition source of the composition image (S110). That is, the filter 37 determines whether the scanner selection button 126a is selected on the setting screen 120. It is noted that, depending on an operation of the composition image acquisition source selection buttons 126 on the setting screen 120, a method of acquiring the composition image differs. When the scanner selection button 126a is operated on the setting screen 120 (S110: YES), the filter 37 executes a scan image composing process (S114). On the other hand, when the folder selection button 126b is operated on the setting screen 120 (S110: NO), the filter 37 executes a folder image composing process (S116). Details of the scan image composing process and the folder image composing process are shown in FIG. 9 and FIG. 10, respectively.

When the scanner selection button 126a is selected (S110: YES) and the scan image composing process shown in FIG. 9 is executed, the user set, in advance, originals 140 and 142 respectively shown in FIGS. 5A and 5B on the ADF tray of the scanner 5 as the composition images. According to the embodiment, since the number of pages of the personal resumes 100 and 102 to which the images are to be composed is two, two originals 140 and 142 are set to the ADF tray. That is, in order to obtain images to be composed with the two pages of personal resumes 100 and 102, two originals 140 and 142 are set to the ADF tray. According to the embodiment, the image to be composed with the personal resume 100 is the face image printed on the original 140, and the image to be composed with the personal resume 102 is the face image printed on the original 142. Therefore, the two originals 140 and 142 are set to the ADF tray such that the original 140 is scanned before the original 142.

In the scan image composing process, the filter 37 transmits, through the scanner driver 34, a scan command to scan one original to the scanner 52 (S200). In response to receipt of the scan command, the scanner 52 generates scan data of the original 140 by scanning the same, and transmits the generated scan data to the PC 10. The filter 37 determines whether the scan data is received from the scanner 52 (S202). When the filter 37 receives the scan data (S202:

YES), that is, when the filter receives the scan data of the original 140 as the image data of the image to be composed with the personal resume 100, the process proceeds to S204.

Figure 3A:
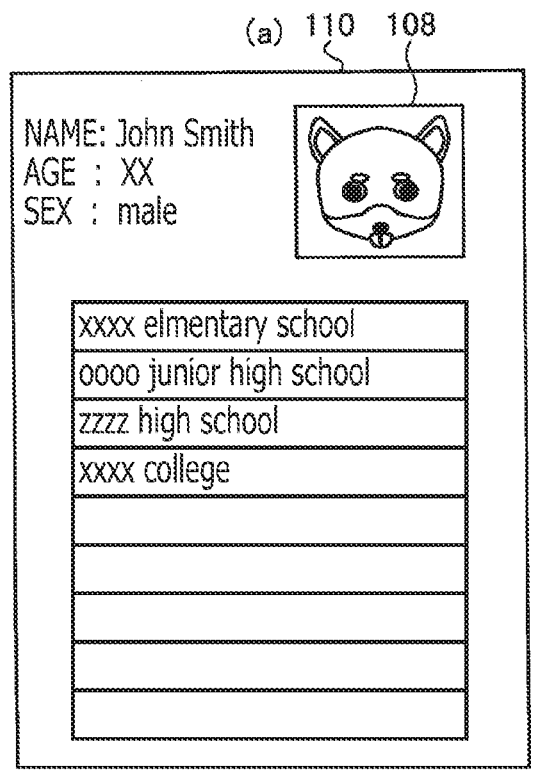
FIGS. 3A and 3B show examples of personal resumes after face images are composed.

In S204, the filter 37 generates image data for printing the personal resume 110 as shown in FIG. 3A by composing the image based on the scan data of the original 140 with the composite area (i.e., the frame 108) of the template of the personal resume 100 shown in FIG. 2A. At this stage, the filter 37 incorporates a drawing command, which instructs to draw an image based on the scan data of the original 140 within the composite area of the template of the personal resume 100, into a postscript format template data of the personal resume 100, thereby image data for printing the personal resume 110 being generated. Then, the filter 37 transmits a print command including the thus generated image data for printing to the printer 50 via the OS 36 (S206). Then, the printer 50 executes a printing process based on the received image data for printing. As a result, the personal resume 110 shown in FIG. 3A is printed.

Figure 8:
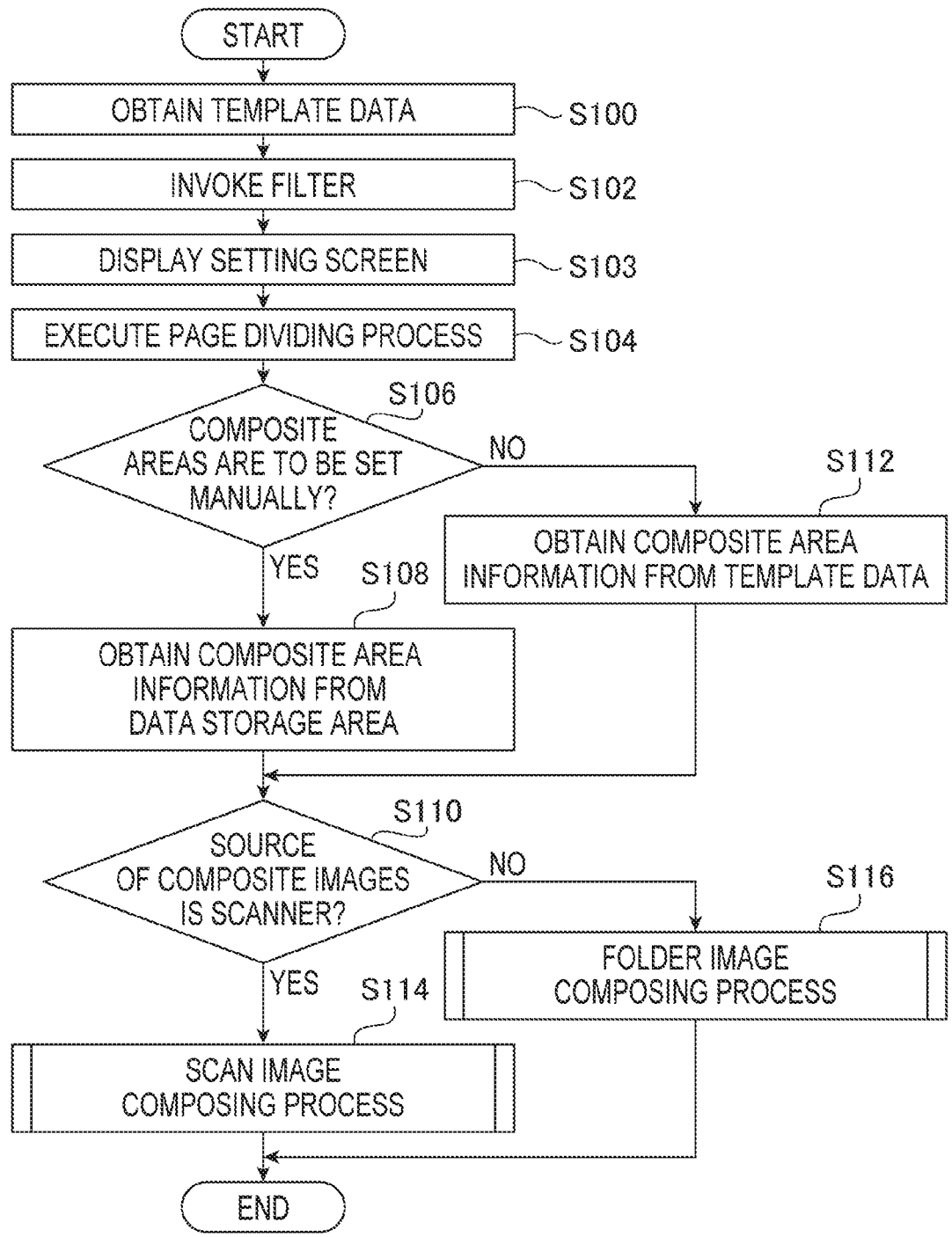
FIG. 8 is a flowchart illustrating a main process of a printer driver.

Next, the filter 37 determines whether or not the print data is generated in correspondence with the text data for all the pages divided in S104 and transmitted to the printer 50 (S208). If the print data corresponding to all the pages of text data has not been transmitted to the printer 50 (S208: NO), the filter 37 returns to S200. When the print data corresponding to all the pages of the text data has been transmitted to the printer 50 (S208: YES), the scan image composing process shown in FIG. 9 is terminated and the process shown in FIG. 8 is also terminated.

When determination in S208 is NO (i.e., when all the pages of text data has not been transmitted to the printer 50), the filter 37 transmits, to the scanner 52 through the scanner driver 34, a scan command to scan one sheet of original (S200). In response to receipt of the scan command, the scanner 52 creates the scan data of the original 142 which is another sheet of original by scanning the original 142 and transmits the scan data to the PC 10. As above, the filter 37 obtains the scan data of the original 142 as the image data to be composed with the personal resume 102 (S202: YES).

Next, the filter 37 creates the image data for printing the personal resume 112 by incorporating a drawing command to draw an image based on the scan data of the original 142 in the composite area of the personal resume 102 into the postscript format template data of the personal resume 102 (S204). Then, the filter 37 transmits the created image data for printing and the print command to the printer 50 (S206). Thus, the printer 50 executes the printing process based on the image data for printing received from the filter 37, thereby the personal resume 112 shown in FIG. 3B being printed.

Figure 6:
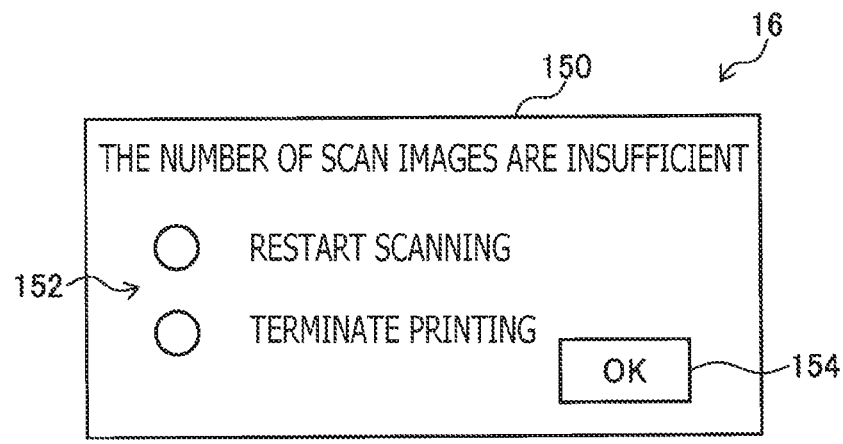
FIG. 6 shows a first notifying screen.

As mentioned above, the printer driver 32 has received two pages of template data. Therefore, in order to compose face images on the personal resumes 100 and 102 based on the two pages of template data, two originals 140 and 142 should be set to the ADF tray of the scanner 52. However, there could be a case where the user sets only one original in such a situation. Alternatively, a jam may occur during the scanning process and the scanning process may not be executed appropriately. In such a case, that is, when images to be composed with the two pages of personal resumes 100 and 102 are necessary but the second scan data cannot be received (S202: NO), the filter 37 displays a first notifying screen 150 as shown in FIG. 6 on the LCD 16 (S210).

On the first notifying screen 150, radio buttons 152 for selecting restart of scanning or end of printing, and an OK button 154 are displayed. When the user wants to restart of the scanning process, the user may select the radio button 152 for restarting of the scanning process and operate the OK button 154 after the user sets the originals on the ADF tray of the scanner or resolves the jam of the scanner 52. When the ratio buttons 152 for restart of the scanning process is selected and the OK button 154 is operated (S212: YES), the filter 37 transmits the scan command to the scanner 52 (S200). As above, the scan data necessary for the second page of the personal resume 102 can be obtained. When the radio button 152 for selecting end of printing is selected and the OK button 154 is operated (S212: NO), the scan image composing process shown in FIG. 9 is terminated, and the process shown in FIG. 8 is terminated.

In the above-described embodiment, the filter 37 generates one image data for printing every time when one piece of scan data is obtained. The configuration may be modified such that all the pieces of scan data are obtained before generating the image data for printing, and a plurality of pieces of image data for printing based on the template data for all the pages may be sequentially generated with use of the obtained scan data. That is, the filter 37 may obtain the scan data of the original 140 and the scan data of the original 142 before generating the image data for printing. Then, the filter 37 may generate the image data for printing the personal resume 110 based on the template data of the personal resume 100 and the scan data of the original 140, and generate the image data for printing the personal resume 112 based on the template data of the personal resume 102 and the scan data of the original 142.

Figure 11:
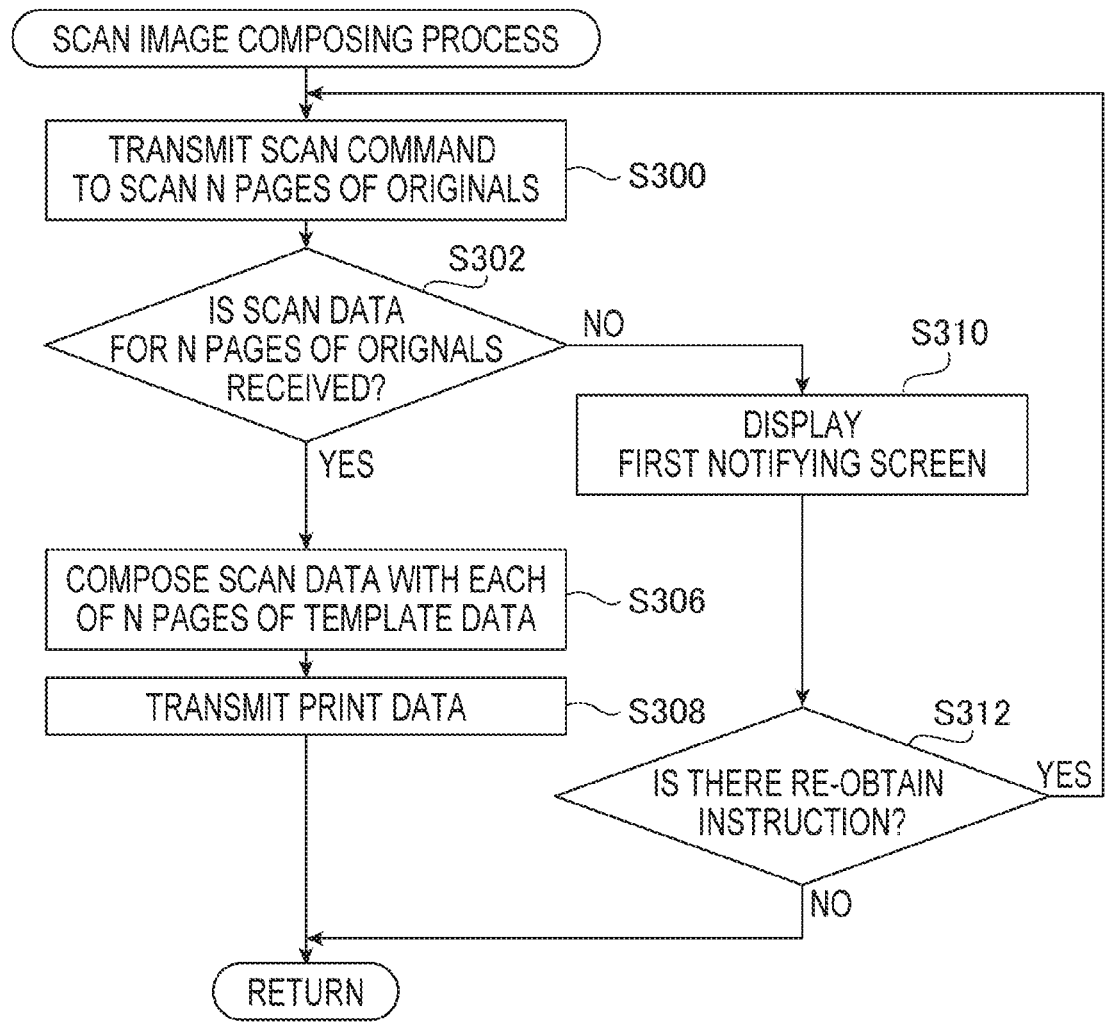
FIG. 11 is a flowchart illustrating another scan image composing process executed by the printer driver.

Concretely, for the above modification, the scan image composing process shown in FIG. 11 is executed instead of the scan image composing process shown in FIG. 9. In the scan image composing process shown in FIG. 11, when the filter 37 divides the template data obtained from the application 30 into a plurality of pieces of template data each corresponding one page of template, the filter 37 recognizes the number of pages of the images based on the divided template data. At this stage, when the template data obtained from the application 30 is divided into N pages of template data, the filter 37 transmits the scan commands for N pages to the scanner 52 through the scanner driver 34 (S300). When a plurality of originals are placed on the ADF, the scanner 52 scans the placed originals sequentially and transmits the scan data to the filter 37. The filter 37 determines whether the scan data corresponding to the N pages of originals have been received from the scanner 52 (S302).

When the scan data corresponding to the N pages of originals have not been received (S302: NO), the filter 37 displays the first notifying screen 150 on the LCD 16 (S310). The filter 37 then determines whether there is a user operation to re-obtain the scan data (S312). When there is a user operation instructing to re-obtain the scan data (S312: YES), the filter 37 returns to S300. When there is not a user operation instructing to re-obtain the scan data (S312: NO), the filter 37 terminates the scan image composing process shown in FIG. 11, and the process shown in FIG. 8 is also terminated. It is noted that the filter 37 may transmit the scan command without designating the number of pages in S300, and may obtain scan data corresponding to the N pages of originals, from the top, from the scan data received from the scanner 52 in S302.

On the other hand, when the filter 37 receives the scan data corresponding to the N pages of originals (S302: YES), the filter creates N pages of image data for printing based on the N pages of template data and N pages of originals (S306). That is, when the filter 37 receives the scan data of the original 140 and the scan data of the original 142, the filter 37 generates the image data for printing the personal resume 110 based on the scan data of the original 140 and the template data of the personal resume 100, and the image data for printing the personal resume 112 based on the scan data of the original 142 and the template data of the personal resume 102. Then, the filter 37 transmits the thus generated image data for printing to the printer 50 (S308). As above, even when a plurality of originals set to the ADF are scanned at a time, the image data for printing the respective personal resumes (e.g., the personal resumes 110 and 112) can be generated.

Next, processes when the filter 37 determines that the folder selection button 126b is operated on the setting screen 120 in S110 will be described. When the folder selection button 126b is operated on the setting screen 120 (S110: NO), the filter 37 obtains the image data, which has been stored in a particular folder of the data storage area 38 in advance, as the image data of composition image.

Figure 5A:
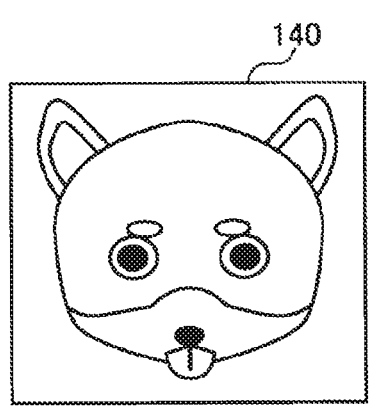
FIGS. 5A and 5B show examples of originals on which face images are printed, respectively.
Figure 5B:
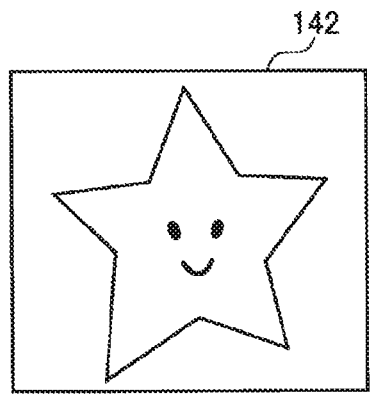

For example, the user creates a folder of which name (or a path of the folder) is "C:\Jpeg" in the data storage area 38, and stores the imaged data of the composition image. According to the embodiment, the image data of the faces printing on the originals 140 and 142 shown in FIGS. 5A and 5B are stored. Further, the user creates a setting table in the data storage area 38. The setting table indicates a page of the template data, with which the image data is to be composed. In the setting table, for example, the image data of the original 140 is set as the image data to be composed with the first page of the template data, and the image data of the original 142 is set as the image data to be composed with the second page of the template data.

When the selection button 126b is selected on the setting screen 120 (S110: NO), the filter 37 executes the folder image composing process (S116). In the folder image composing process, as shown in FIG. 10, the filter 37 obtains, from the data storage area 38, input information in the folder name input filed 128 on the setting screen 120 as the folder information (S220). It is noted that, since the user has stored image data of the composition image in the folder "C:\Jpeg", the user has already input "C:\Jpeg" in the folder name input filed 128 on the setting screen 120. Therefore, the filter 37 obtains "C:\Jpeg" as the input information in the folder name input field 128. Further, the filter 37 obtains the setting table from the data storage area 38 as the folder information (S220). That is, the filter 37 obtains the folder name "C:\Jpeg" and the setting table as the folder information (S220).

Then, the filter 37 obtains the image data from the folder "C:\Jpeg", and determines whether the image data to be composed with the first page of template data from among the obtained image data, that is, the image data of the original 140 (S222).

When the image data of the original 140 has been obtained (S222: YES), the filter 37 generates the image data for printing the personal resume 110 shown in FIG. 3A by composing the image data of the original 140 with the composite area (i.e., the frame 108) of the personal resume 100 shown in FIG. 2A (S224). The filter 37 generates the image data for printing the personal resume 110 by incorporating the drawing command instructing to draw an image based on the image data of the original 140 into the postscript-format template data of the personal resume 100. Thereafter, the filter 37 transmits the image data for printing and the print instruction to the printer 50 (S226). According to the above, as the printer 50 executes the printing process based on the received image data for printing, the personal resume 110 shown in FIG. 3A is printed out.

Next, the filter 37 determines whether the print data corresponding to all the pages of text data divided in S104 have been generated and transmitted to the printer 50 (S228). When the print data corresponding to all the pages of text data has not been transmitted to the printer 50 (S228: NO), the filter 37 returns to S220. When the print data corresponding to all the pages of text data has been transmitted to the printer (S228: YES), the folder image composing process shown in FIG. 10 is terminated and the process shown in FIG. 8 is also terminated.

Figure 3B:
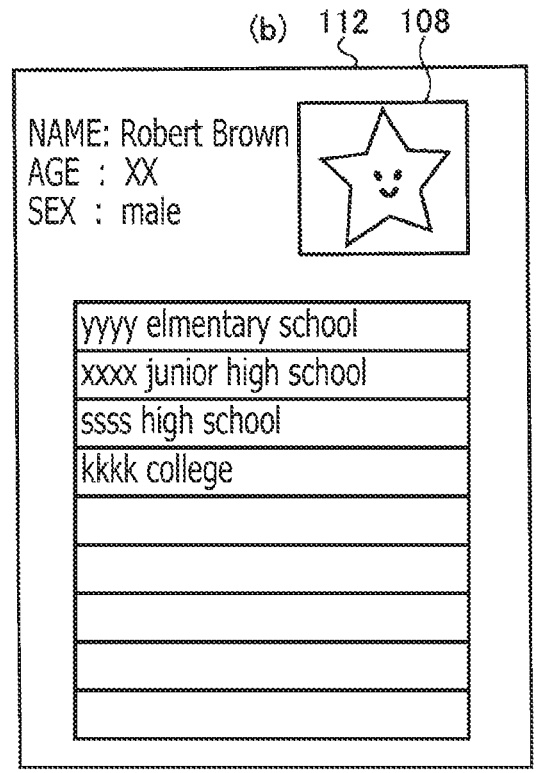

On the other hand, when the determination in S228 is negative (S228: NO), the filter 37 obtains the image data (i.e., the image data of the original 142) to be composed with the second page template data from among the image data obtained from the folder based on the obtained folder name "C:\Jpeg" and the setting table (S222: YES). Next, the filter 37 generates the image data for printing the personal resume 112 by incorporating the drawing command instructing to draw an image based on the image data of the original 142 into the postscript-format template data of the personal resume 102 (S224). Thereafter, the filter 37 transmits the image data for printing and the print instruction to the printer 50 (S226). According to the above, as the printer 50 executes the printing process based on the received image data for printing, the personal resume 112 shown in FIG. 3B is printed out.

Figure 7:
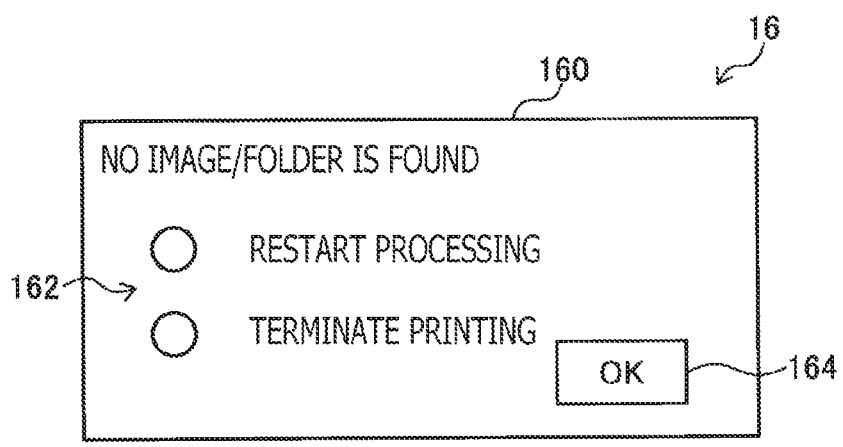
FIG. 7 shows a second notifying screen.

There could be a case where the image data has not been stored in the folder "C:\Jpeg", the folder itself does not exist in the data storage area 38, or the setting table is not stored in the data storage area 38. In such a case, the filter 37 cannot obtain the image data of the composition image. Thus, when the filter 37 cannot obtain the image data of the composition image (S222: NO), the filter 37 displays the second notifying screen 160 (see FIG. 7) on the LCD 16 (S230). On the second notifying screen 160, ratio buttons 162 to select restart of the process or termination of the printing process, and an OK button 164. When the user wishes to restart the printing process, the user may select the radio button 162 to select restart of the printing process and operates the OK button 164. When the radio button 162 to select restart of the printing process is selected and the OK button 164 is operated (S232: YES), the filter 37 retries to obtain the image data of the composition images from the folder based on the setting table (S222: YES). Accordingly, the filter 37 can generate the image data for printing the personal resumes 110 and 112. When the ratio button 162 to terminate the printing process is selected and the OK button 164 is operated (S232: NO), the folder image composing process shown in FIG. 8 is terminated and the process shown in FIG. 10 is also terminated.

S100 executed by the CPU 12 is an example of a first obtaining process. S108 and S112 executed by the CPU 12 are examples of an identifying process. S202, S222 and S302 executed by the CPU are examples of a second obtaining process. S204, S224 and S306 executed by the CPU are examples of a generating process. S206, S226 and S308 executed by the CPU are examples of an outputting process. S210 and S310 executed by the CPU 12 are examples of a first displaying process. S220 executed by the CPU 12 is an example of a third obtaining process. S230 executed by the CPU 12 is an example of a second displaying process.

Effects of the Embodiments

According to the above-described embodiments, the following effects can be achieved.

The printer driver 32 obtains the template data from the application 30. Further, the printer driver 32 obtains the image data of the composition images from the scanner 52 or from the folder in the data storage area 38. Further, the printer driver 32 identifies the composite areas in the images based on the template data, that is, the personal resumes 100 and 102. It is noted that the composite areas are identified based on the template data or the folder information stored in the storage area 38. Then, the printer driver 32 generates the image data of the personal resumes 110 and 112 by composing the composition images with the composite areas of the personal resumes 100 and 102, respectively. As above, the personal resumes 110 and 112 can be generated without requiring the user to obtain the composition images or without requiring the user to compose the images with the personal resumes 100 and 102, respectively.

Further, the folder information with which the composite areas can be identified is stored in the data storage area 38, and the filter 37 obtains the folder information from the data storage area 38 and identifies the composite areas based on the obtained folder information. Thus, when the user stores arbitrary folder information in the data storage area 38, arbitrary areas of the personal resumes 100 and 102 can be set as the composite areas.

Further, information with which the composite areas can be identified is stored in the template data, and the filter 37 extracts such information from the template data, and identifies the composite areas based on the thus obtained information. Accordingly, it becomes possible to identify the composite areas without storing the folder information of the arbitrary folder in the data storage area 38, and troublesome operation of the user can be omitted.

Further, the template data is the postscript-format data, and the filter 37 generates the image data for printing the personal resumes 110 and 112 by incorporating the drawing command, which instructs to draw the composition images within the composite areas 100 and 102, into the postscript-format template data. According to the above configuration, the composition images can be appropriately composed with the composite areas, respectively.

The filter 37 transmits the scan command to the scanner 52, and obtains the scan data generated by the scanner 52 in response to the scan command as the image data of the composition images. Then, the filter 37 generates the image data representing the images in which the images based on the obtained scan data are composed with the composite areas of the personal resumes 100 and 102, respectively. According to this configuration, simply by setting, to the scanner, the originals on which the composition images are printed, the personal resumes 110 and 112 on which the face images are composed can be generated.

When the application 30 generates a plurality of pages of template data, the filter 37 obtains the necessary number of pieces of scan data for the plurality of pages of template data. That is, when the application 30 generates the two pages of template data (e.g., the template data for the personal resumes 100 and 102), the filter 37 obtains the necessary number of scan data (e.g., the originals 140 and 142). Then, the filter 37 generates the print data of the personal resume 110 by composing the original 140 within the composite area of the personal resume 100, and the print data of the personal resume 112 by composing the original 142 within the composite area of the personal resume 102. Accordingly, it is possible that different images are composed with images based on the plurality of pages of template data, respectively.

The filter 37 generates, every time obtaining the scan data of an original of one page, the print data of the personal resume (110 and 112) by composing the composition image based on the scan data with the composite area of the personal resume (100 and 102) based on the template data of one page. Accordingly, the scan data and the personal resumes 100 and 102 which are subject to composing of the images based on the scan data can be appropriately associated with each other.

When the application 30 generates a plurality of pages of template data, if the filter 37 cannot obtain the necessary number of pieces of scan data corresponding to the plurality of pages of the template data, the filter 37 displays the first notifying screen 150 indicating the same on the LCD 16. After the first notifying screen 150 is displayed, the filter 37 transmits again the scan command to the scanner 52. Accordingly, it is ensured that the necessary number of pages of scan data can be obtained for the plurality of pages of the template.

The filter 37 obtains the folder name of the folder storing the image data of the composition images, and obtains the composition images from the folder having the obtained folder name. Then, the filter 37 generates the image data of the composed images which are generated by composing the images based on the obtained image data with the composite areas of the personal resumes 100 and 102, respectively. According to the above configuration, by storing the image data of the composition images (i.e., image data of the face images) in the folder, the personal resumes 110 and 112 in which the face images have been composed can be generated.

When the application 30 has generated a plurality of pages of template data, if the filter 37 cannot obtain the necessary number of pages of image data corresponding to the plurality of pages of template data, the filter 37 displays the second notifying screen 160 indicating the same on the LCD 16. After displaying the second notifying screen 160, the filter 37 retries to obtain the image data from the folder. According to this configuration, it is ensured that the necessary number of pages of image data corresponding to the plurality of pages of the template data can be obtained.

Aspects of the present disclosures need not be limited to the above-described embodiments, but can be embodied and/or modified in various ways based on knowledge of person skilled in the art. For example, in the above-described embodiment, the postscript-format template data is employed as the image data of the images subject to be composed (i.e., the personal resumes 100 and 102), but data other than the postscript-format data may be employed. Further, the image data of the images subject to composing need not be limited to the template data generated by the application 30, but can be image data having been stored in the data storage area 38 in advance, image data obtained from another device, or the like.

In the above-described embodiments, only one composition image is printed on one original set to the scanner 52. Aspects of the present disclosures need not be limited to such a configuration and a plurality of composition images may be printed on one original. In such a case, each of the plurality of composition images may be identified based on the scan data, and can be used for generating a plurality of pieces of print data. That is, with use of a first image of the plurality of composition images, first print data may be generated, and with use of a second image of the plurality of composition images, second print data may be generated.

According to the illustrative embodiments, the processes shown in FIGS. 8-11 are executed by the CPU 12. It should be noted that such processes may be executed not only by the CPU 12 but also by an ASIC or other logical integrated circuit and/or by an appropriate combination of the same.

What is claims is:

1. A non-transitory computer-readable recording medium storing computer-readable instructions that are executable by a controller of an information processing device, the information processing device comprising a communication interface configured to communicate with a scanner, the instructions causing, when executed by the controller, the information processing device to execute:
   a first obtaining process when receiving an output instruction of image data from an application program implemented in the information processing device, the first obtaining process being a process of obtaining the image data designated by the application program; and
   an image output instructing process of instructing to output composition image data based on the image data designated by the application program,
   wherein the image output instructing process includes:
      a first identifying process of identifying a plurality pieces of page data included in the image data designated by the application program;
      a second identifying process of identifying a composite area within each of a plurality of page images represented by the plurality of pieces of page data, respectively;
      a second obtaining process of obtaining a plurality of pieces of composition image data of a plurality of composition images from a data source, the data source being set to the information processing device, the second obtaining process automatically transmitting without requiring a user operation to instruct scanning, a scan command to the scanner through the communication interface after the image data is obtained by the first obtaining process, and obtaining scan data from the scanner as the plurality of pieces of composition image data;
      a generating process of generating a plurality of pieces of output image data, each of the plurality of pieces of output image data representing an output image in which one of the plurality of composition images represented by the plurality of pieces of composition image data obtained by the second obtaining process is composed within the composite area, which is identified by the second identifying process, of each of the plurality of page images represented by the plurality of pieces of page data identified by the first identifying process, composition image data representing a composition image to be composed within a page image of an Nth page and composition image data representing a composition image to be composed within a page image of an N+1th page being different from each other; and
      an instructing process of instructing an image outputting device connected to the information processing device to output the output image represented by each of the plurality of pieces of output image data generated by the generating process,
   wherein the generating process generates the output image data indicating the output image in which one of the plurality of the composition images, which is indicated by the scan data obtained by the second obtaining process, is composed within the composite area of each of the plurality of page images,
   wherein, when the first obtaining process obtains the image data indicating the plurality of page images, the second obtaining process obtains a necessary number of pieces of the scan data for the plurality of page images as the plurality of composition images, and
   wherein the generating process generates the output image data for each of the plurality of page images, the output image data indicating the output image in which one of the plurality of composition images, which is indicated by the scan data obtained by the second obtaining process, is composed within the composite area of each of the plurality of page images identified by the second identifying process.

2. The non-transitory computer-readable recording medium storing computer-readable instructions that are executed by a controller of an information processing device according to claim 1,
   wherein the information processing device comprises a memory configured to store composite area information indicating the composite area of each of the plurality of page images,
   wherein the second identifying process obtains the composite area information from the memory and identifies the composite area based on the composite area information, and
   wherein the generating process generates the plurality of pieces of output image data, each of the plurality of pieces of output image data indicating the output image in which one of the plurality of composition images, which are indicated by the composition image data obtained by the second obtaining process, is composed within the composite area of each of a plurality of page images.

3. The non-transitory computer-readable recording medium storing computer-readable instructions that are executed by a controller of an information processing device according to claim 1,
   wherein each the plurality of pieces of page data includes composite area information indicating the composite area of each of the plurality of page images indicated by each the plurality of pieces of page data,
   wherein the second identifying process obtains the composite area information from each the plurality of pieces of page data and identifies the composite area based on the composite area information, and
   wherein the generating process generates the plurality of pieces of output image data, each of the plurality of pieces of output image data indicating the output image in which one of the plurality of composition images, which are indicated by the plurality of pieces of composition image data obtained by the second obtaining process, is composed within the composite area of each of a plurality of page images.

4. The non-transitory computer-readable recording medium storing computer-readable instructions that are executed by a controller of an information processing device according to claim 1,
   wherein the first obtaining process obtains the image data in a postscript format, and
   wherein the generating process the plurality of pieces of output image data by automatically incorporating, into the image data, a drawing command to draw each of the plurality of composition images, which are indicated by the plurality of pieces of composition image data obtained by the second obtaining process, in the composite area of the image data identified by the second identifying process.

5. The non-transitory computer-readable recording medium storing computer-readable instructions that are executed by a controller of an information processing device according to claim 1,
wherein, when the first obtaining process obtains the image data indicating the plurality of page images, the second obtaining process transmits the scan command to the scanner for a same number of times as a number of page images, and obtains a necessary number of pieces of the scan data for the plurality of page images from the scanner by obtaining a necessary number of the scan data for one page image of the page images in response to single transmission of the scan command to the scanner, and
wherein, in response to obtaining the necessary number of the scan data for one page of the page images from the scanner, the generating process generates the output image data indicating the output image in which one of the plurality of composition images, which are indicated by the obtained scan data, is composed within the composite area of each of the plurality of page images identified by the second identifying process.

6. The non-transitory computer-readable recording medium storing computer-readable instructions that are executed by a controller of an information processing device according to claim 1,
wherein the information processing device comprises a display,
wherein, when the second obtaining process cannot obtains a necessary number of pieces of the scan data for the plurality of page images while the first obtaining process having obtained the image data indicating the plurality of page images, the instructions causing, when executed by the controller, the information processing device to execute a first displaying process of displaying a notifying image indicating that the necessary number of the scan data for the plurality of page images cannot be obtained,
wherein, after the first displaying process displays the notifying image, the second obtaining process retransmits the scan command to the scanner through the communication interface and obtains the scan data from the scanner.

7. The non-transitory computer-readable recording medium storing computer-readable instructions that are executed by a controller of an information processing device according to claim 1,
wherein the instructions causing, when executed by the controller, the information processing device to execute a third obtaining process of obtaining data storage area information indicating a data storage area in which the plurality of pieces of composition image data is stored,
wherein the second obtaining process obtains the plurality of pieces of composition image data from the data storage area indicated by the data storage area information obtained by the third obtaining process, and
wherein the generating process generates the output image data indicating the output image in which one of the plurality of composition images, which are indicated by the plurality of pieces of composition image data obtained by the second obtaining process, is composed with the composite area of each of the plurality of page images identified by the second identifying process.

8. The non-transitory computer-readable recording medium storing computer-readable instructions that are executed by a controller of an information processing device according to claim 7,
wherein the information processing device comprises a display,
wherein, when the first obtaining process obtains the image data indicating the plurality of page images, the second obtaining process obtains a necessary number of pages of the composition images for the plurality of page images from the data storage area indicated by the data storage area information obtained by the third obtaining process,
wherein the generating process generates, for each of the plurality of page images, the output image data indicating the output image in which one of the plurality of composition images, which are indicated by scan data obtained by the second obtaining process, is composed with the composite area of each of the plurality of page images,
wherein, when the second obtaining process cannot obtains a necessary number of composition images for the plurality of page images while the first obtaining process having obtained the image data indicating the plurality of page images, the instructions causing, when executed by the controller, the information processing device to execute a second displaying process of displaying a notifying image indicating that the necessary number of the composition images for the plurality of page images cannot be obtained, and
wherein, after the second displaying process displays the notifying image, the second obtaining process reobtains the composition images from the data storage area indicated by the data storage area information obtained by the third obtaining process.

9. The non-transitory computer-readable recording medium storing computer-readable instructions that are executed by a controller of an information processing device according to claim 1,
wherein the instructions is a printer driver for controlling a printer,
wherein the first obtaining process obtains the image data generated by the application installed in the information processing device through a printing system implemented to an operation system which is installed in the information processing device,
wherein the generating process generates the output image data, for printing, indicating the output image in which one of the plurality of composition images, which are indicated by the plurality pieces of composition image data obtained by the second obtaining process, is composed with the composite area of each of the plurality of page images, and
wherein the instructing process instructs the image outputting device to output the output image data, for printing, generated by the generating process to the printer.

10. An information processing device having a controller, the controller is configured to perform:
a first obtaining process when receiving an output instruction of image data from an application program implemented in the information processing device, the first obtaining process being a process of obtaining the image data designated by the application program; and
an image output instructing process of instructing to output composition image data based on the image data designated by the application program, wherein the image output instructing process includes:
- a first identifying process of identifying a plurality pieces of page data included in the image data designated by the application program;
- a second identifying process of identifying a composite area within each of a plurality of page images represented by the plurality of pieces of page data, respectively;
- a second obtaining process of obtaining a plurality of pieces of composition image data of a plurality of composition images from a data source, the data source being set to the information processing device, the second obtaining process automatically transmitting without requiring a user operation to instruct scanning, a scan command to the scanner through the communication interface after the image data is obtained by the first obtaining process, and obtaining scan data from the scanner as the plurality of pieces of composition image data;
- a generating process of generating a plurality of pieces of output image data, each of the plurality of pieces of output image data representing an output image in which one of the plurality of composition images represented by the composition image data obtained by the second obtaining process is composed within the composite area, which is identified by the second identifying process, of each of the plurality of page images represented by the plurality of pieces of page data identified by the first identifying process, composition image data representing a composition image to be composed within a page image of an Nth page and composition image data representing a composition image to be composed within a page image of an N+1th page being different from each other; and
- an instructing process of instructing an image outputting device connected to the information processing device to output the output image represented by each of the plurality of pieces of output image data generated by the generating process, wherein the generating process generates the output image data indicating the output image in which one of the plurality of the composition images, which is indicated by the scan data obtained by the second obtaining process, is composed within the composite area of each of the plurality of page images, wherein, when the first obtaining process obtains the image data indicating the plurality of page images, the second obtaining process obtains a necessary number of pieces of the scan data for the plurality of page images as the plurality of composition images, and wherein the generating process generates the output image data for each of the plurality of page images, the output image data indicating the output image in which one of the plurality of composition images, which is indicated by the scan data obtained by the second obtaining process, is composed within the composite area of each of the plurality of page images identified by the second identifying process.

11. An image processing system comprising:
an information processing device having a controller; and
a printer;
the controller is configured to perform:
a first obtaining process when receiving an output instruction of image data from an application program implemented in the information processing device, the first obtaining process being a process of obtaining the image data designated by the application program; and
an image output instructing process of instructing to output composition image data based on the image data designated by the application program, wherein the image output instructing process includes:
- a first identifying process of identifying a plurality pieces of page data included in the image data designated by the application program;
- a second identifying process of identifying a composite area within each of a plurality of page images represented by the plurality of pieces of page data, respectively;
- a second obtaining process of obtaining a plurality of pieces of composition image data of a plurality of composition images from a data source, the data source being set to the information processing device, the second obtaining process automatically transmitting without requiring a user operation to instruct scanning, a scan command to the scanner through the communication interface after the image data is obtained by the first obtaining process, and obtaining scan data from the scanner as the plurality of pieces of composition image data;
- a generating process of generating a plurality of pieces of output image data, each of the plurality of pieces of output image data representing an output image in which one of the plurality of composition images represented by the plurality of pieces of composition image data obtained by the second obtaining process is composed within the composite area, which is identified by the second identifying process, of each of the plurality of page images represented by the plurality of pieces of page data identified by the first identifying process, composition image data representing a composition image to be composed within a page image of an Nth page and composition image data representing a composition image to be composed within a page image of an N+1th page being different from each other; and
- an instructing process of instructing an image outputting device connected to the information processing device to output, to the printer, the output image represented by each of the plurality of pieces of output image data generated by the generating process, wherein the generating process generates the output image data indicating the output image in which one of the plurality of the composition images, which is indicated by the scan data obtained by the second obtaining process, is composed within the composite area of each of the plurality of page images, wherein, when the first obtaining process obtains the image data indicating the plurality of page images, the second obtaining process obtains a necessary number of pieces of the scan data for the plurality of page images as the plurality of composition images, and wherein the generating process generates the output image data for each of the plurality of page images, the output image data indicating the output image in which one of the plurality of composition images, which is indicated by the scan data obtained by the second obtaining process, is composed within the composite area of each of the plurality of page images identified by the second identifying process.

\* \* \* \* \*